United States Patent [19]

Toshimitsu

[11] Patent Number: 5,121,655
[45] Date of Patent: Jun. 16, 1992

[54] COAXIAL COARSE AND FINE ADJUSTING DEVICE

[75] Inventor: Kunio Toshimitsu, Yokohama, Japan

[73] Assignee: Nikon Corporation, Tokyo, Japan

[21] Appl. No.: 583,246

[22] Filed: Sep. 17, 1990

[30] Foreign Application Priority Data

Sep. 27, 1989 [JP] Japan ................................. 1-251037

[51] Int. Cl.$^5$ ...................... F16H 37/06; F16H 35/18; F16H 29/20; G02B 21/32
[52] U.S. Cl. ................................ 74/665 B; 74/10.54; 74/89.17; 359/392
[58] Field of Search ................... 74/10.45, 10.5, 10.52, 74/10.54, 10.8, 665 B, 89.17; 350/530

[56] References Cited

U.S. PATENT DOCUMENTS

| | | | |
|---|---|---|---|
| 3,683,704 | 8/1972 | Kuroha | 74/10.52 |
| 4,083,256 | 4/1978 | Shio | 74/10.52 |
| 4,445,758 | 5/1984 | Emmel | 350/530 |
| 4,482,221 | 11/1984 | Clark | 350/530 |
| 4,573,771 | 3/1986 | Hill | 74/665 B X |
| 4,968,118 | 11/1990 | Maki et al. | 74/422 X |

*Primary Examiner*—Allan D. Herrmann
*Assistant Examiner*—Julie Krolikowski
*Attorney, Agent, or Firm*—Shapiro and Shapiro

[57] ABSTRACT

A coaxial fine and coarse adjusting device for moving a movable member movably supported on a device body includes a coarse adjustment handle, a fine adjustment handle provided coaxially with respect to the coarse adjustment handle, a bearing member fixed to the device body, a rotation transmission shaft rotatingly supported in the bearing member, the rotation transmission shaft having a pinion for the movement of the movable member, a hollow cylindrical coarse adjustment shaft which passes through the rotation transmission shaft and is rotatably supported by the rotation transmission shaft and the bearing member, a rotatable fine adjustment shaft which passes through the coarse adjustment shaft, a reduction gear train provided between the rotation transmission shaft and the fine adjustment shaft, a first retaining member provided on one end of the coarse adjustment shaft for retaining the reduction gear train in such a manner that it can turn around about its own axis and rotate about the coarse adjustment shaft and for removably retaining the coarse adjustment handle, a flange member provided on the other end of the coarse adjustment shaft, a second retaining member provided on one end of the fine adjustment shaft for removably retaining the fine adjustment handle, a shaft end collar provided on the other end of the fine adjustment shaft in opposed relation to the flange member, a first frictional braking means for frictionally braking the first retaining member such that it inhibits a rotation of the first retaining member relative to the device body while the fine adjustment handle is being rotated and such that it allows for the rotation of the first retaining member relative to the device body while the coarse adjustment handle is being rotated, and a second frictional braking means for frictionally braking a rotation of the shaft end collar relative to the flange member such that it inhibits a relative rotation between the fine adjustment shaft and the coarse adjustment shaft while the coarse adjustment shaft is being rotated and such that it allows for the relative rotation while the fine adjustment handle is being rotated.

15 Claims, 5 Drawing Sheets

COAXIAL COARSE AND FINE ADJUSTING DEVICE

BACKGROUND OF THE INVENTION

1. Field of the Invention

The present invention relates to a coaxial coarse and fine adjusting device having a plurality of handles in a coaxial fashion, and more particularly, to a coaxial coarse and fine adjusting device suitable for use as a focusing device for a microscope.

2. Related Background Art

A conventional focusing device for a microscope includes a two-step moving mechanism which consists of a fine adjusting mechanism used to finely focus an intermediate or high magnification objective, and a coarse adjusting mechanism used to finely focus a low magnification objective, to coarsely focus a low, intermediate or high magnification objective, and to move up or down through a large distance a stage for the exchange of a sample or for oil immersion operation.

Figure 5:
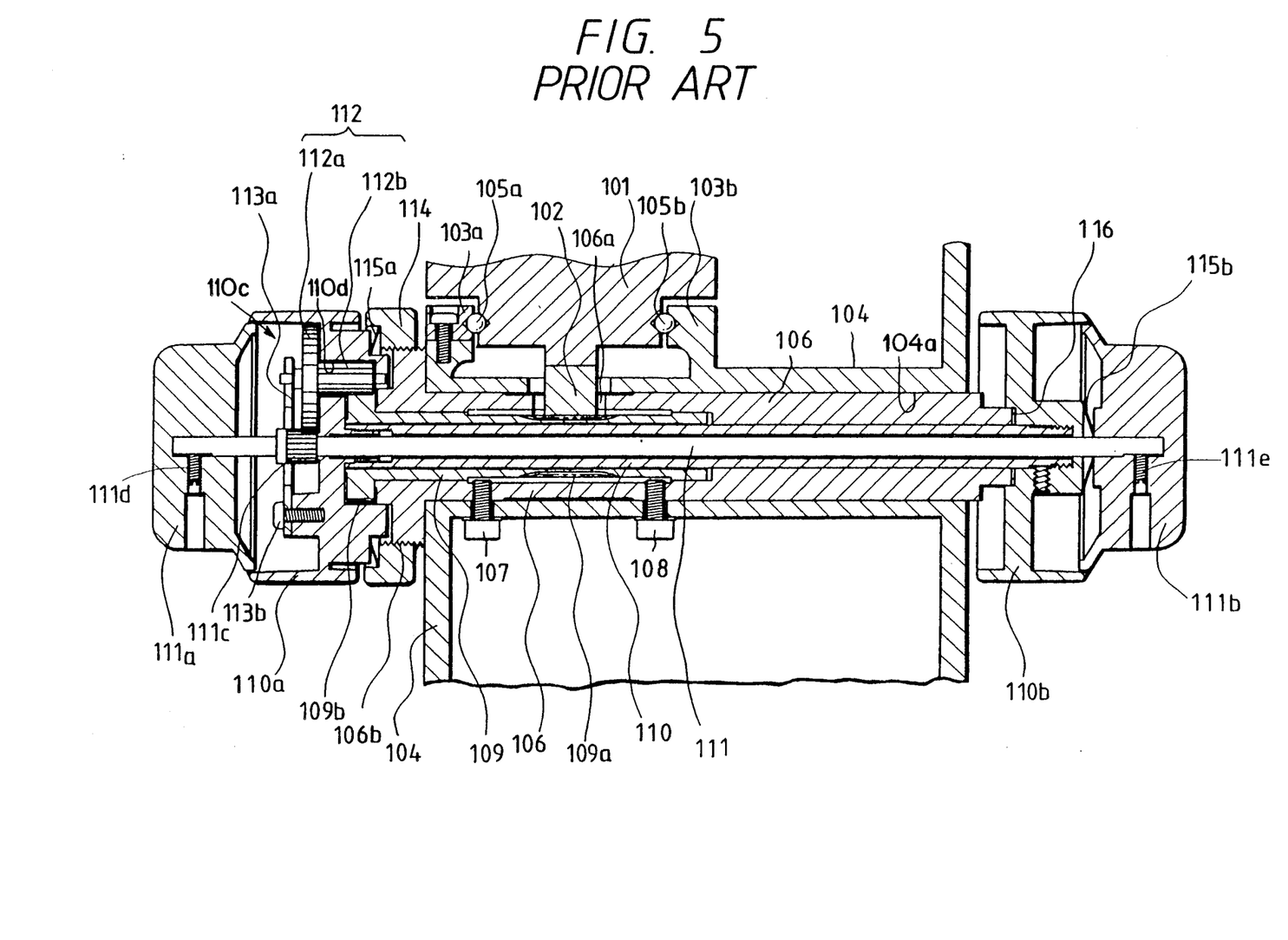
FIG. 5 is a cross-sectional view of a conventional coaxial fine and coarse adjusting device.

The focusing fine and coarse adjusting device of the above-described type which includes the two-step moving mechanism has one linear movement guiding mechanism with the moving mechanism which employs coaxial fine and coarse adjustment handles attached thereto, as shown in FIG. 5. The structure thereof will be described in detail below.

In the device shown in FIG. 5, a linear movement guiding inner race 101 is mounted on a movable stage (not shown) on which a sample is placed, and a rack 102 is fixed to the lower portion of the linear movement guiding inner race 101. An outer race 103a as viewed on the left in FIG. 5 is fixed to a microscope body 104, and an outer race 103b as viewed on the right in FIG. 5 is formed integrally with the microscope body 104. The outer races 103a and 103b support the inner race 101 through a large number of balls (including balls 105a and 105b shown in FIG. 5) arranged in a direction perpendicular to the surface of the paper in such a manner that the outer race 101 can be moved in a direction perpendicular to the paper.

A hollow fixed cylinder 106 for a bearing is fitted in a through-hole 104a formed in the microscope body 104. The hollow fixed cylinder 106 is fixed to the microscope body 104 by means of fixing screws 107 and 108. A hollow cylindrical rotation transmission shaft 109 is rotatably fitted in the left part of a hollow portion of the fixed cylinder 106 for the bearing. The rotation transmission shaft 109 has a pinion 109a formed on a peripheral surface thereof. The pinion 109a is in mesh with the rack 102 which passes through an elongated hole 106a formed in the circumferential direction of the fixed cylinder 106. A gear 109b is provided on one end of the rotation transmission shaft 109 which is located at the left end of the fixed cylinder 106. A hollow cylindrical coarse adjustment coupling shaft 110 is rotatably fitted in the right part of the hollow portion of the fixed cylinder 106 and a hollow portion of the rotation transmission shaft 109. A first coarse adjusting handle 110a is fixed to the left end of the coarse adjustment coupling shaft 110 and a second coarse adjusting handle 110b is fixed to the right end of the coarse adjustment coupling shaft 110. A rod-like fine adjustment coupling shaft 111 is rotatably fitted in a hollow portion of the coarse adjustment coupling shaft 110. A first fine adjusting handle 111a is fixed to the left end of the fine adjustment coupling shaft 111 and a second fine adjusting handle 111b is fixed to the right end of the fine adjustment coupling shaft 111.

In an inner hollow portion 110c of the coarse adjusting handle 110a which is closed by the first fine adjusting handle 111a, a small gear 111c is fixed to the portion of the fine adjustment coupling shaft 111 which is located in that inner hollow portion. The small gear 111c is in mesh with a large gear 112a which is integrally formed with a small gear 112b. The large gear 112a and the small gear 112b are used as a stepped gear 112. The small gear 112b is inserted in a circular hole 110d formed in a side wall portion of the coarse adjusting handle 110a. The gears 112a and 112b are rotatably supported on a plate-like ring 113a fixed to the side wall portion of the coarse adjusting handle 110a by a fixing screw 113b. Part of the inner peripheral surface of the circular hole 110d is notched to form an opening, and the small gear 112b is in mesh with the gear 109b through this opening.

Between a ring member 114 threadedly engaged with an externally threaded portion 106b formed on one end of the fixed cylinder 106 and the coarse adjusting handle 110a there is provided a conical plate spring 115a. Also, a conical plate spring 115b is held between the fine adjusting handle 111b and the coarse adjusting handle 110b which are located on the right as viewed in FIG. 5. The frictional force of the plate spring 115a located on the left is adjusted to a value larger than or equal to that of the plate spring 115b located on the right by the rotation of the ring member 114. A sliding member 116 is held between the coarse adjusting handle 110b and the other end of the fixed cylinder 106.

The coarse and fine adjustment operation conducted by the thus-arranged coarse and fine adjusting device having coaxial handles will be described below.

The fine adjusting device is operated by the rotation of at least one of the fine adjusting handles 111a and 111b. When the frictional force of the plate spring 115a located on the left as viewed in FIG. 5 is larger than that of the plate spring 115b located on the right, even if the fine adjusting handle 111a or 111b is rotated, the coarse adjusting handles 110a and 110b and the coarse adjustment coupling shaft 110 remain stationary due to the frictional force of the plate spring 115a. Thus, rotation of the fine adjusting handle 111a or 111b rotates the coupling shaft 111 in a state in which it is supported by the coarse adjustment coupling shaft 110 which is in a fixed state. Also, when the frictional force of the right and left plate springs 115a and 115b is equal, even if the fine adjusting handle 111a or 111b is rotated, the coarse adjusting handles 110a and 110b and the coarse adjustment coupling shaft 110 remain unrotated due to the frictional force between the fixed cylinder 106 and the coarse adjusting coupling shaft 110, and the fine adjustment coupling shaft 111 thus rotates in a state in which it is supported by the coarse adjustment coupling shaft 110 which is in a fixed state, as in the above case. As the fine adjustment coupling shaft 111 is rotated by the rotation of the fine handle 111a or 111b, the small gear 111c rotates together with the fine adjustment coupling shaft 111, thereby rotating the large gear 112a in a reduced speed with respect to the coarse adjusting handle 110a which is in a fixed state. In consequence, the gear 109b also rotates in a reduced speed by the rotation of the small gear 112b which is formed integrally with the large gear 112a, thereby rotating the rotation transmission shaft 109 in the same direction in which the fine adjusting handle 111a or 111b is rotated. As the rotation transmission shaft 109 rotates, the pinion 109a also rotates, thereby moving the rack 102 which is in mesh with the pinion 109a in a direction perpendicular to the surface of the paper. Movement of the rack 102 moves the outer race 101 and the movable stage (not shown) in the same direction.

The coarse adjusting device is operated by the rotation of at least one of the coarse adjusting handles 110a and 110b against the frictional force of the left plate spring 115a. As the right coarse adjusting handle 110b is rotated, the fine adjusting handle 111b, the fine adjustment coupling shaft 111 and the left fine adjusting handle 111a rotate due to the frictional force of the plate spring 115b, thereby rotating the small gear 111c. However, since the left coarse adjusting handle 110a also rotates at that time, the large gear 112a is not rotated about it own axis but rotates about the fine adjustment coupling shaft 111 by the rotation of the small gear 111c in a state in which it is in mesh with the small gear 111c. Consequently, the small gear 112b which is formed integrally with the large gear 112a also rotates about the shaft 111 in the same direction, thereby rotating the rotation transmission shaft 109 through the gear 109b which is in mesh with the small gear 112b in the same direction in which the coarse adjusting handle 110a or 110b is rotated. Rotation of the rotation transmission shaft 109 moves, through the pinion 109a and the rack 102, the outer race 101 in a direction perpendicular to the surface of the paper, which in turn moves the movable stage (not shown) in the same direction as that in which the outer race 101 is moved.

When the conventional coaxial fine and coarse adjusting device, including the fine adjusting mechanism and the coarse adjusting mechanism, is used for observation of samples or for various experiments conducted on the samples, it is used together with various attachments such as X-Y stage or other devices. Such attachments or devices are placed close to and around the microscope body 104. However, the handles 110a, 110b, 111a and 111b protruding from the microscope body 104, as shown in FIG. 5, make it difficult for various attachments to be placed around the microscope body 104. This inconvenience may be eliminated by removing at least one of the fine and coarse adjusting handles. However, removal of the handles leads to the following problems.

When the coarse adjusting handle 110a is to be removed after the fine adjusting handle 111a is removed from the fine adjustment coupling shaft 111 by loosening the screw 111d, since the stepped gear 112 is rotatably supported on the coarse adjusting handle 110a through the plate-shaped ring 113a which is fixed to the coarse adjusting handle 111a by the fixing screw 113b, the plate-shaped ring 113a and the stepped gear 112 must be removed by removing the fixing screw 113b. Then, the coarse adjusting handle 110a must be removed from the coarse adjustment coupling shaft 110. This is a troublesome task. Furthermore, removal of the stepped gear 112 eliminates engagement of the small gear 112b with the gear 109b of the rotation transmission shaft 109. This makes transmission of rotation to the rotation transmission shaft 109 impossible and, hence, defeats the function of this fine and coarse adjusting device.

When the coarse adjusting handle 110b is to be removed from the coarse adjustment coupling shaft 110 after the fine adjusting handle 111b is removed from the fine adjustment coupling shaft 111 by loosening the screw 111e, the plate spring 115b must also be removed. Removal of the handles 110b and 111b is therefore also a troublesome task. Moreover, removal of the plate spring 115b leaves an inadequate frictional force between the coarse adjustment coupling shaft 110 and the fine adjustment coupling shaft 111. This makes concurrent rotation of the handles 110a and 111a required for the coarse adjusting operation impossible, and thus defeats the function of the fine and coarse adjusting device.

When the fine adjusting handle 111a is mounted subsequent to the mounting of the coarse adjusting handle 110a, the following time-consuming tasks are necessary: the small gear 112b of the stepped gear 112 is first inserted into the circular hole 110d in the side wall of the coarse adjusting handle 110a and then engaged with the gear 109b of the rotation transmission shaft 109. Next, the stepped gear 112 is made to be rotatably supported by the plate-shaped ring 113a and then fixed by the fixing screw 113b. On the other hand, mounting of the coarse adjusting handle 110b and the fine adjusting handle 111b requires insertion of the plate spring 115b and adjustment of the urging force thereof. This is also a time-consuming task.

SUMMARY OF THE INVENTION

In view of the aforementioned drawbacks of the prior fine and coarse adjusting device, an object of the present invention is to provide a coaxial fine and coarse adjusting device which is improved such that it does not require a troublesome task for removal and mounting of coarse and fine adjusting handles and such that removal of the handles does not defeat the function of the device.

To this end, the present invention provides a coaxial fine and coarse adjusting device for moving a movable member movably supported on a device body, which comprises a coarse adjustment handle, a fine adjustment handle provided coaxially with respect to the coarse adjustment handle, a bearing member fixed to the device body, a rotation transmission shaft rotatably supported in the bearing member, the rotation transmission shaft having a pinion for the movement of the movable member, a hollow cylindrical coarse adjustment shaft which passes through the rotation transmission shaft and is rotatably supported by the rotation transmission shaft and the bearing member, a rotatable fine adjustment shaft which passes through the coarse adjustment shaft, a reduction gear train provided between the rotation transmission shaft and the fine adjustment shaft, a first retaining member provided on one end of the coarse adjustment shaft for retaining the reduction gear train in such a manner that it can rotate about its own axis and rotate about the coarse adjustment shaft and for removably retaining the coarse adjustment handle, a flange member provided on the other end of the coarse adjustment shaft, a second retaining member provided on one end of the fine adjustment shaft for removably retaining the fine adjustment handle, a shaft end collar provided on the other end of the fine adjustment shaft in opposed relation to the flange member, a first frictional braking means for frictionally braking the first retaining member such that it inhibits rotation of the first retaining member relative to the device body while the fine adjustment handle is being rotated and such that it allows rotation of the first retaining member relative to the device body while the coarse adjustment handle is being rotated, and a second frictional braking means for frictionally braking rotation of the shaft end collar relative to the flange member such that it inhibits relative rotation between the fine adjustment shaft and the coarse adjustment shaft while the coarse adjustment shaft is being rotated and such that it allows such relative rotation while the fine adjustment handle is being rotated.

In the thus-arranged fine and coarse adjusting device, the fine adjustment handle can be removed from the second retaining member. Also, since the first retaining member for rotatably supporting the reduction gear train and for removably retaining the coarse adjustment handle is fixed to one end of the coarse adjustment shaft, removal of the coarse adjustment handle does not require removal of the reduction gear train. Removal of the fine and coarse adjustment handles is therefore not a troublesome task. Furthermore, since the frictional braking means is provided between the flange member provided on the other end of the coarse adjustment shaft and the shaft end collar provided on the other end of the fine adjustment shaft, removal of the coarse adjustment handle and the fine adjustment handle, which are provided one end of the coarse adjustment shaft and the fine adjustment shaft, does not require removal of the frictional braking means, and thus does not defeat the function of the fine and coarse adjusting device. As a result, a motor driven by an external device may be coupled to a mounting portion of the handle after the fine and coarse adjusting handles are removed to drive the device by the motor.

When the coarse adjusting handle is first mounted again on the first retaining member and the fine adjusting handle is then mounted again on the second retaining member, since the reduction gear train is already supported on the first retaining member, mounting of the reduction gear train is not necessary, unlike the conventional device. Furthermore, mounting of the frictional braking means on the other end of the fine and coarse adjustment shafts is not necessary, and a time-consuming troublesome task can thus be eliminated.

Thus, according to the present invention, when the fine and coarse adjusting handles are to be removed and mounted again, the fine adjusting handle is simply removed or mounted again subsequent to the removal or mounting of the coarse adjusting handle, and a troublesome task required in the conventional device is not necessary. Furthermore, removal of the handles does not defeat the function of the device, and this allows the device to be driven by a motor or the like with a simple mounting operation.

Other objects, features and advantages of the invention will become apparent from the detailed discussion of the accompanying drawings herein-after.

DESCRIPTION OF THE PREFERRED EMBODIMENTS

Embodiments of the present invention will now be described with reference to the accompanying drawings.

Figure 1:
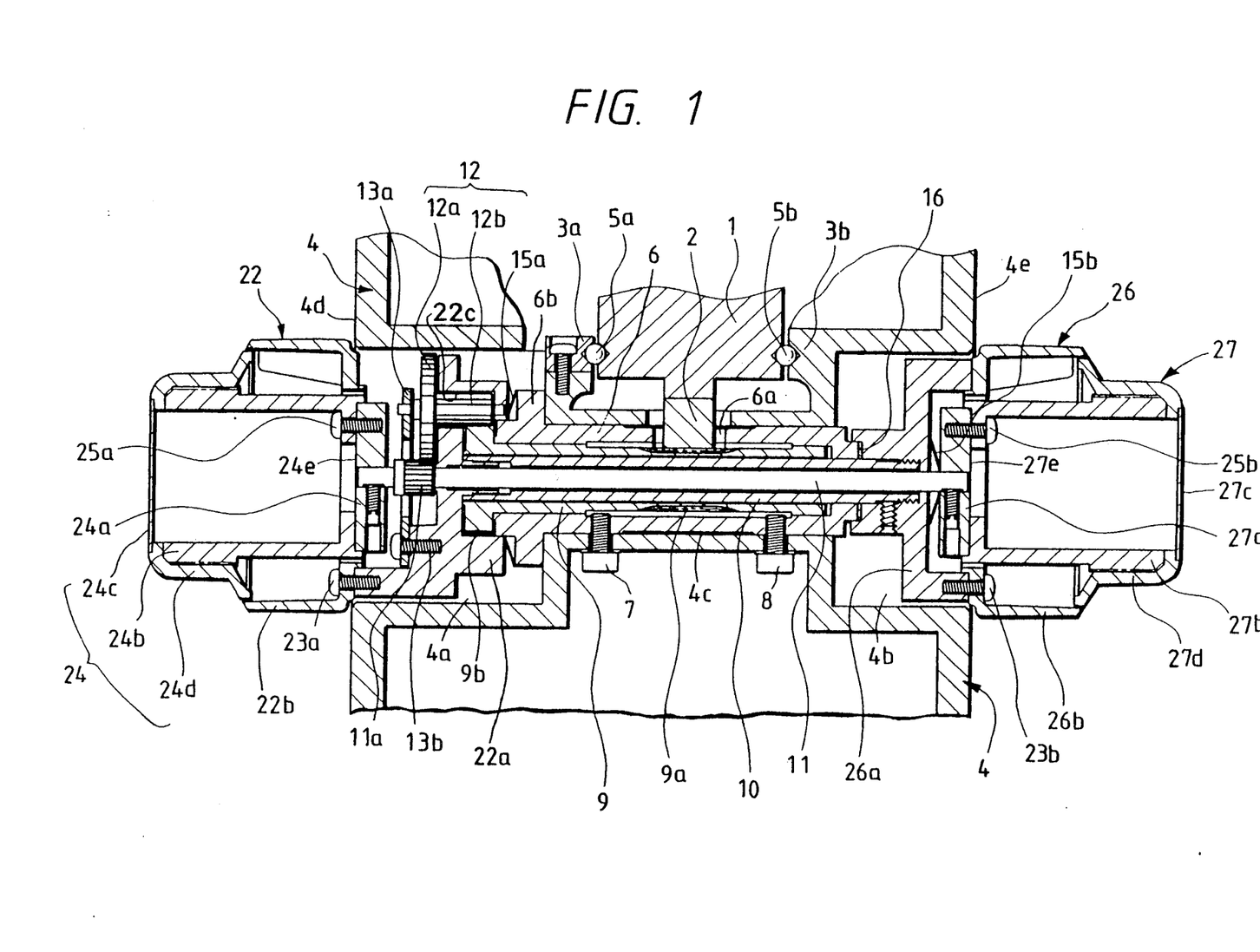
FIG. 1 is a cross-sectional view of a first embodiment of a coaxial fine and coarse adjusting device according to the present invention.

FIG. 1 is a cross-sectional view of a first embodiment of a coaxial fine and coarse adjusting device according to the present invention which is for use in an elevator for a microscope stage.

In the fine and coarse adjusting device, a rack 2 is fixed to the central portion of an inner race 1 mounted on a movable stage which is not shown. An outer race 3a which is located on the left as viewed in FIG. 1 is fixed to a microscope body 4, and an outer race 3b which is located on the right as viewed in FIG. 1 is formed integrally with the microscope body 4. The outer races 3a and 3b support the inner race 1 in such a manner that the inner race is movable in a direction perpendicular to the surface of the paper through a large number of balls 5a and 5b disposed in a direction perpendicular to the surface of the paper.

The microscope body 4 has in it a reduction gear chamber 4a which is open to a left wall surface 4d of the body 4 and which has a circular cross-section, as well as a flange chamber 4b which is open to a right wall surface 4e and which has a circular cross-section. The microscope body 4 also has a through-hole portion 4c between the reduction gear chamber 4a and the flange chamber 4b. A hollow fixed cylinder 6 for a shaft bearing is fixed to microscope body 4 inside the through-hole portion 4c by means of fixing screws 7 and 8. The fixed cylinder 6 has on its left end portion a collar portion 6b which protrudes from the outer periphery of the fixed cylinder 6. Inside the fixed cylinder 6, a hollow cylindrical rotation transmission shaft 9, a hollow cylindrical coarse adjustment coupling shaft 10 and a rod-like fine adjustment coupling shaft 11 are rotatably fitted in that order in a coaxial fashion.

A pinion 9a is provided on the outer peripheral surface of the rotation transmission shaft 9. The rack 2 passes through an elongated hole 6a formed in the circumferential direction of the fixed cylinder 6 and is brought into mesh with the pinion 9a. The rotation transmission shaft 9 has on its left end a gear 9b. A substantially cylindrical retaining member 22a for retaining a reduction stepped gear is fixed to the left end of the coarse adjustment coupling shaft 10 near the gear 9b. The fine adjustment coupling shaft 11 passes through the retaining member 22a. The fine adjustment coupling shaft 11 is rotatably supported by the retaining member 22a and a flange member 26a which will be described later.

The fine adjustment coupling shaft 11 has on its left end portion a small gear 11a, which is in mesh with a large gear 12a integrally formed with a small gear 12b.

The large gear 12a and the small gear 12b in combination form a stepped gear 12. The small gear 12b is inserted into a circular hole 22c formed in the retaining member 22a. The stepped gear 12, consisting of the large gear 12a and the small gear 12b, is supported by a plate-shaped ring 13a fixed to the retaining member 22a by means of a fixing screw 13b. The gear 9b provided on the left end of the rotation transmission shaft 9 is in mesh with the small gear 12b, as shown in FIG. 1.

A conical plate spring 15a is gripped between the right end surface of the retaining member 22a and the collar portion 6b of the fixed cylinder 6 so as to exert an adequate frictional force to the retaining member 22a. The left end surface of the retaining member 22a is located slightly inward from the left wall surface 4d of the microscope body 4, i.e., inside of the reduction gear chamber 4a from the left wall surface 4d of the microscope body 4. A hollow cylindrical coarse adjustment operation ring 22b is removably fixed to the left end surface of the retaining member 22a by means of a fixing screw 23a outside of the microscope body 4. The coarse adjustment operation ring 22b constitutes a left coarse adjustment handle 22. A disk member 24a is fixed to the left end portion of the fine adjustment coupling shaft 11, and a fine adjustment relaying cylinder 24b is removably fixed to the disk member 24a by means of a fixing screw 25a inside of the coarse adjustment operation ring 22b. A fine adjustment operation ring 24d whose one opening is closed by a lid member 24c is fixed to the left end portion of the fine adjustment relaying cylinder 24b. One end of the fine adjustment operation ring 24d is in engagement with the inner periphery of one of the openings of the coarse adjustment operation ring 22b. The surface of the disk member 24a on which the fine adjustment relaying cylinder is mounted is located slightly inward from the left wall surface 4d of the microscope body 4, i.e., inside of the reduction gear chamber 4a, like the left end surface of the retaining member 22a. The fine adjustment relaying cylinder 24b, the lid member 24c and the fine adjustment operation ring 24d in combination form a left fine adjusting handle 24.

A cylindrical flange member 26a having a shoulder is fixed to the right end portion of the coarse adjustment coupling shaft 10. A disk member 27a having the same configuration as that of the left disk member 24a is fixed to the right end of the fine adjustment coupling shaft 11 which passes through the central portion of the flange member 26a. A conical plate spring 15b is gripped between the disk member 27a and the flange member 26a to exert an adequate frictional force to the disk member 27a when the disk member 27a is rotated with respect to the flange member 26a.

The frictional force of the plate spring 15b is set to a value slightly smaller than or equal to that of the left plate spring 15a. A coarse adjustment operation ring 26b having the same configuration as that of the left coarse adjustment operation ring 22b is removably fixed to the right end surface of the flange member 26a by means of a fixing screw 23b. The right end surface of the flange member 26a is located slightly inward from the right wall surface 4e of the microscope body 4, i.e., inside of the flange chamber 4b. The coarse adjustment operation ring 26b constitutes the right coarse adjusting handle 26.

A fine adjustment relaying cylinder 27b having the same configuration as that of the left fine adjustment relaying cylinder 24b is removably fixed to the disk member 27a by means of a fixing screw 25b inside of the coarse adjustment operation ring 26b. A surface 27e of the disk member 27a on which the fine adjustment relaying cylinder is mounted is located slightly inward from the right wall surface 4e of the microscope body 4, i.e., inside of the flange chamber 4b, like the right end surface of the flange member 26a. A fine adjustment operation ring 27d, which has the same configuration as that of the fine adjustment operation ring 24d and whose one opening is closed by a lid member 27c, is fixed to the right end portion of the fine adjustment relaying cylinder 27b. One end of the fine adjustment operation ring 27d is in engagement with the inner periphery of one of the openings of the coarse adjustment operation ring 26b, as shown in FIG. 1. The fine adjustment relaying cylinder 27b, the lid member 27c and the fine adjustment operation ring 27d in combination form a right fine adjusting handle 27.

In the thus-arranged fine and coarse adjusting device, when either of the right and left fine adjustment operation rings 24d and 27d is rotated, the rotation transmission shaft 9 is rotated through the small gear 11a provided on the fine adjustment coupling shaft 11, the stepped gear 12 and the gear 9b, thereby finely moving the inner race 1 through the pinion 9a and the rack 2 along the outer races 3a and 3b in a direction perpendicular to the surface of the paper. As a result, the microscope stage (not shown) is finely moved together with the inner race 1 in accordance with the rotation of the fine adjustment operation rings 24d or 27d. At that time, since the retaining member 22a is braked due to the frictional force of the conical plate spring 15a and is rendered stationary, the coarse adjustment operation rings 22b and 26b, the coarse adjustment coupling shaft 10 and the flange member 26a are also rendered stationary.

When either of the coarse adjustment operation rings 22b and 26b is rotated, the retaining member 22a rotates about the coarse adjustment coupling shaft 10 against the frictional force of the conical plate spring 15a. At that time, since the flange member 26a also rotates together with the coarse adjustment coupling shaft 10, the disk member 27a rotates together with the flange member 26a due to the frictional force of the conical plate spring 15b, thereby rotating the fine adjustment coupling shaft 11 together with the coarse adjustment coupling shaft 10. Hence, the fine adjusting handles 24 and 27 rotate together with the coarse adjusting handles 22 and 26. At that time, the stepped gear 12 rotates about the fine adjustment coupling shaft 11 without rotating about its own axis, thereby rotating the gear 9b and the rotation transmission shaft 9 together with coarse adjusting handles 22 and 26 without reducing the speed thereof. As a result, the microscope stage (not shown) is moved together with the rack 2 and the inner race 1, without the speed thereof being reduced, in accordance with the rotation of the coarse adjusting handles 22 and 26.

When the presence of the operation rings located on either of the two sides among the operation rings 22b, 26b, 24d and 27d makes it difficult for attachments to be placed around the microscope body, the rings on that side may be removed in the following fashion, taking the left side rings as an example. The left coarse adjustment operation ring 22b is removed from the retaining member 22a by removing the fixing screw 23a, the left fine adjustment operation ring 24d is removed from the fine adjustment relaying cylinder 24b, and then the fine adjustment relaying cylinder 24b is removed from the disk member 24a by removing the fixing screw 25a. In such case, fine and coarse adjusting operation can be performed using only the operation rings located on the other side.

Figure 2:
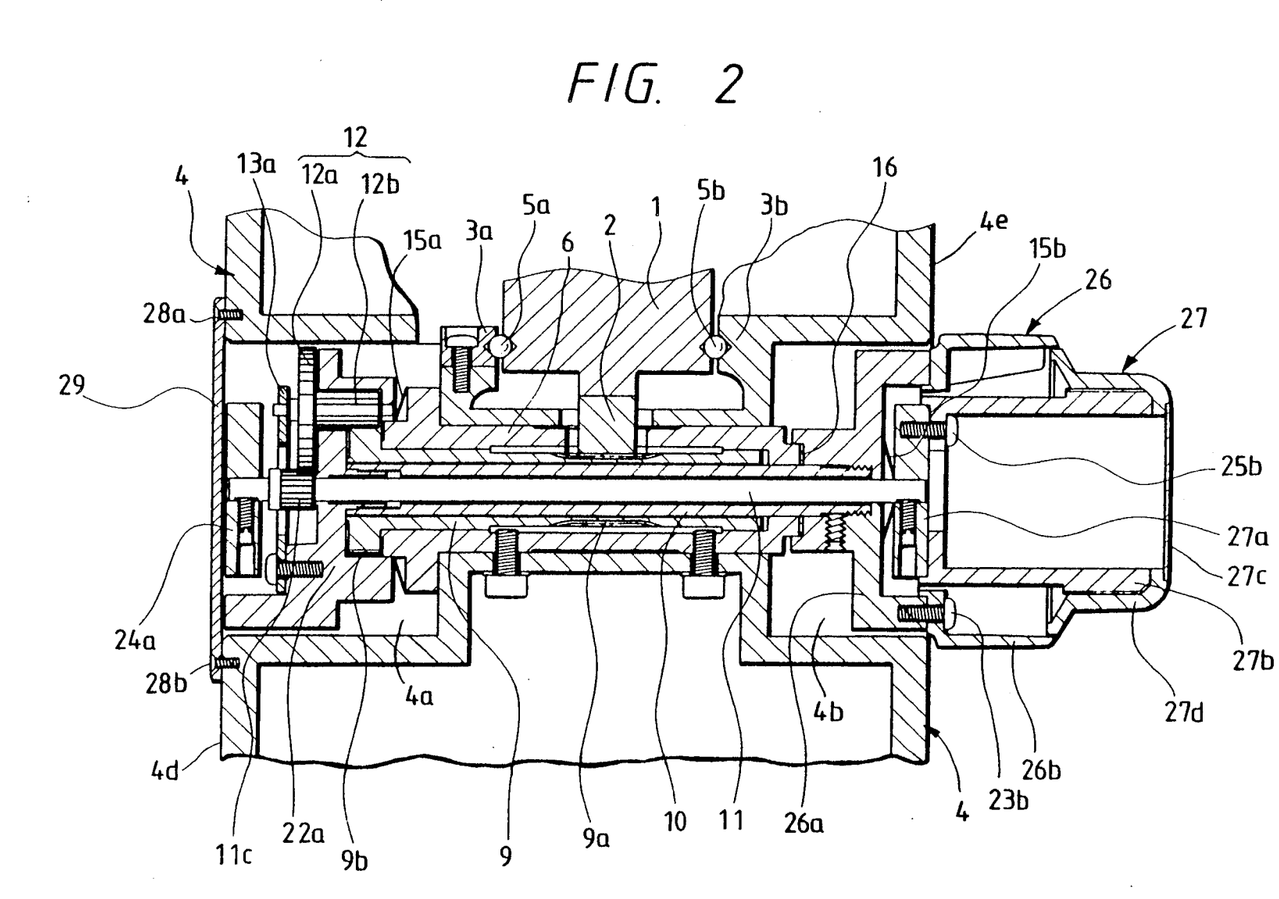
FIG. 2 is a cross-sectional view of a second embodiment of the present invention which differs from the device shown in FIG. 1 in that a left fine adjustment operation ring and a left coarse adjustment operation ring are removed and in that an opening located on the left of a microscope body is closed.

A second embodiment of the present invention will be described below with reference to FIG. 2. A fine and coarse adjusting device shown in FIG. 2 differs from the device shown in FIG. 1 in that it has neither left coarse adjustment operation ring 22b (which is the left coarse adjusting handle) nor the adjustment relaying cylinder 24b and the fine adjustment operation ring 24d (which are the left fine adjusting handle), these being removed from the fine and coarse adjusting device shown in FIG. 1 by removing the fixing screws 23a and 25a, further in that an opening of a first shaft end chamber 4a of the microscope body 4 is closed by a lid member as described below. In FIG. 2, parts which are the same as or correspond to those of FIG. 1 are indicated by the same reference numerals, detailed description thereof being omitted. The opening of the microscope body 4 which is located on the left as viewed in FIG. 2 is closed by a lid member 29 which is fixed to the microscope body 4 by means of fixing screws 28a and 28b. Hence, the side wall surface 4d of the microscope body 4 which is located on the left has no protrusions which make it difficult for the attachments or devices to be placed on the left side of the microscope body 4.

In the fine and coarse adjusting device from which the operation rings 22b and 24d and the fine adjustment relaying cylinder 24b are removed, the stepped gear 12 is still supported on the retaining member 22a, as shown in FIG. 2. Thus, removal or the stepped gear 12 is not necessary, unlike the case of the conventional device shown in FIG. 5, and the removal operation is thus facilitated and the operability to the device is also maintained. Furthermore, in the device shown in FIG. 2, the plate spring 15b is gripped between the flange member 26a for the coupling shafts 10 and 11 and the disk member 27a. Thus, removal of the operation rings 26b and 27d and the fine adjustment relaying cylinder 27b does not require removal of the plate spring 15b, unlike the case of the conventional device shown in FIG. 5. Consequently, an adequate friction force still acts between the coarse adjustment coupling shaft 10 and the fine adjustment coupling shaft 11, and the function of this fine and coarse adjusting device is maintained.

In the fine and coarse adjusting device shown in FIG. 2, for example, a motor may be connected to the retaining member 22a and to the disk member 24a to drive the device by a motor.

When the fine adjustment relaying cylinder 24b of the fine adjusting handle 24 is mounted again on the disk plate member 24a after the coarse adjustment operation ring 22b of the coarse adjusting handle 22 is mounted again on the retaining member 22a, it is not necessary for the stepped gear 12 to be rotatably supported on the plate-like ring 13a beforehand, unlike the case of the conventional device shown in FIG. 5. Mounting of the handles is therefore facilitated.

Figure 3:
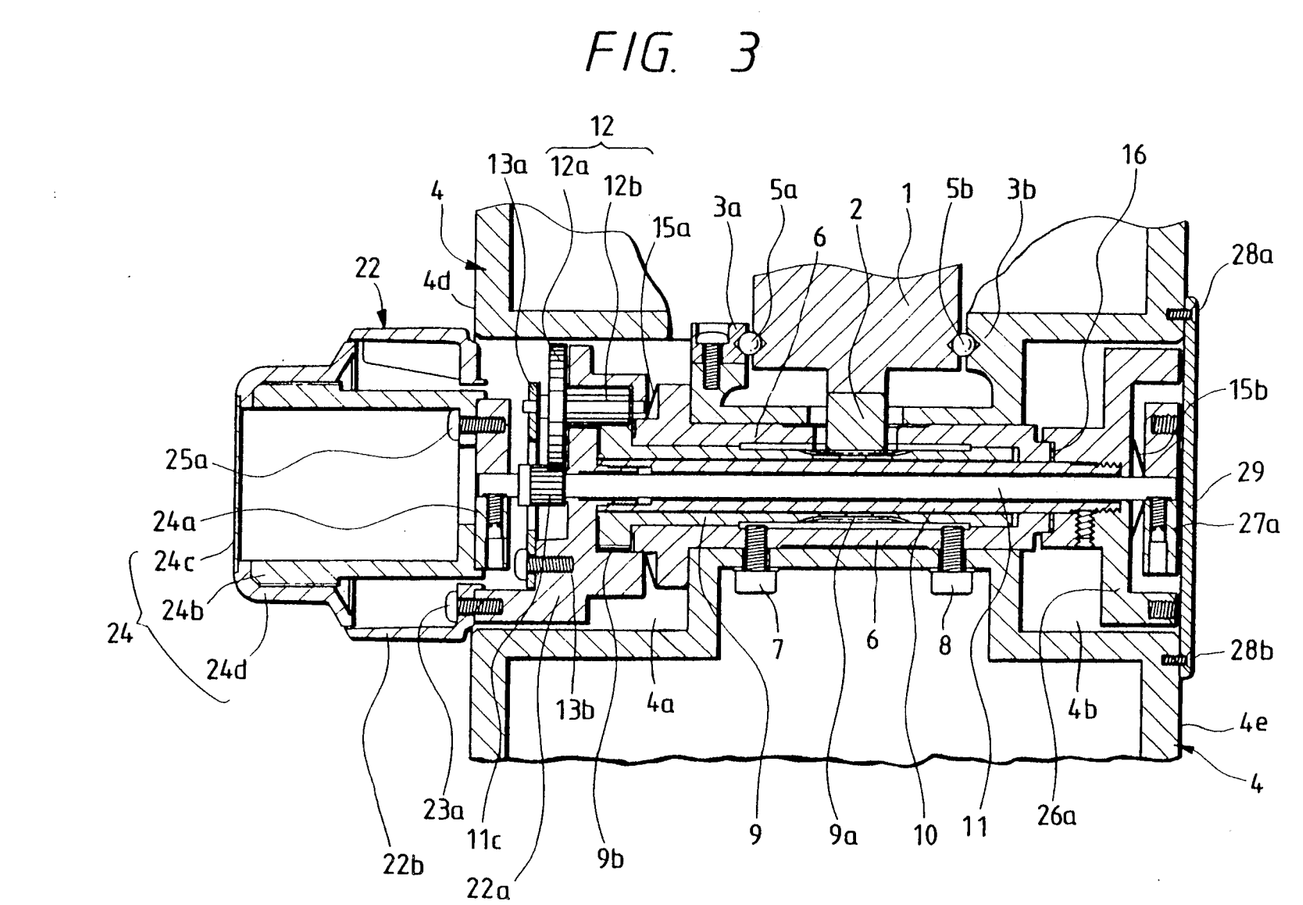
FIG. 3 is a cross-sectional view of a third embodiment of the present invention which differs from the device shown in FIG. 1 in that a right fine adjustment operation ring and a right coarse adjustment operation ring are removed and in which an opening located on the right of the microscope body is closed.

A third embodiment of the present invention will be described below with reference to FIG. 3. A fine and coarse adjusting device shown in FIG. 3 differs from the device shown in FIG. 1 in that it has neither right coarse adjustment operation ring 26b (which is the right coarse adjusting handle) nor the fine adjustment relaying cylinder 27b and the fine adjustment operation ring 27d (which are the right fine adjusting handle), these being removed from the fine and coarse adjusting device shown in FIG. 1 by removing the fixing screws 23b and 25b, and further in that an opening of the flange chamber 4b of the microscope body 4 is closed by a lid member 29. The lid member 29 is fixed to the microscope body 4 by means of fixing screws 28a and 28b. In FIG. 3, parts which are the same as or correspond to those of FIGS. 1 and 2 are indicated by the same reference numerals, detailed description thereof being omitted. The side wall surface 4e of the microscope body 4 which is located on the right has no protrusions which make it difficult for the attachments or devices to be placed on the right side of the microscope body 4.

In the fine and coarse adjusting device from which the operation rings 26b and 27d and the fine adjustment relaying cylinder 27b are removed, the stepped gear 12 is still supported on the retaining member 22a, like the case of the device shown in FIG. 2. Thus, removal of the stepped gear 12 is not necessary, and the removal operation is facilitated. Furthermore, in the device shown in FIG. 3, the plate spring 15b is still gripped between the flange member 26a for the coupling shafts 10 and 11 and the disk member 27a. Thus, the function of this fine and coarse adjusting device does not deteriorate. It is therefore possible to connect, for example, a motor to the flange member 26a and to the disk member 27a (a shaft end collar) to drive the device by a motor.

When the fine adjustment operating ring 27d of the fine adjusting handle 27 is mounted again on the disk plate member 27a through the fine adjustment relaying cylinder 27b after the coarse adjustment operation ring 26b of the coarse adjusting handle 26 is mounted again on the flange member 26a, it is not necessary for a plate spring to be remounted, unlike the case of the conventional device shown in FIG. 5. Mounting of the handles is therefore facilitated.

Figure 4:
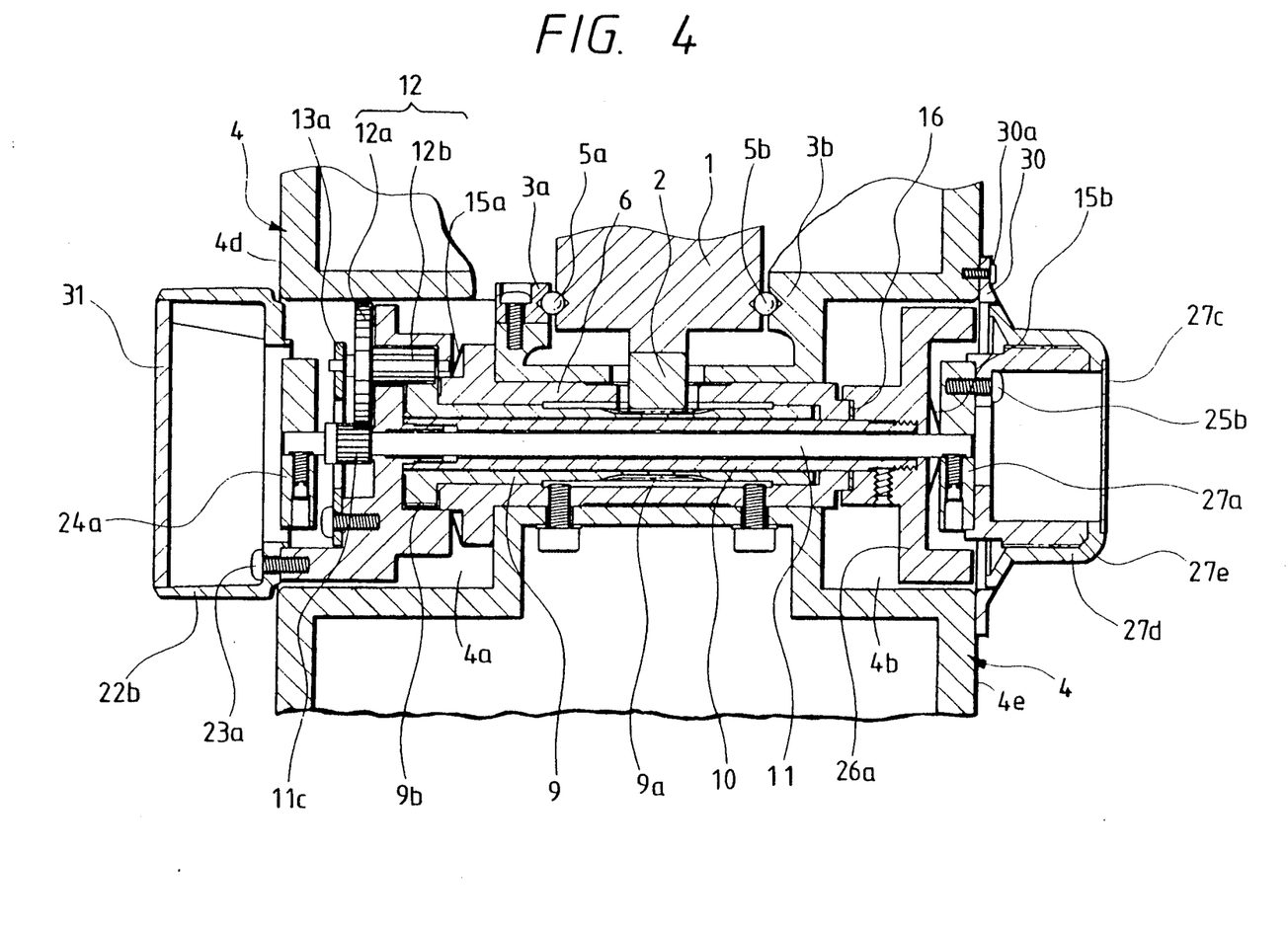
FIG. 4 is a cross-sectional view of a fourth embodiment of the present invention which differs from the device shown in FIG. 1 in that a left fine adjustment operation ring and a right coarse adjustment operation ring are removed and in that it has only the coarse adjustment operation ring on the left and the fine adjustment operation ring on the right.

A fourth embodiment of the present invention will be described below with reference to FIG. 4. The fine and coarse adjusting device shown in FIG. 4 differs from the device shown in FIG. 1 in that it has on its left side neither the fine adjustment operation ring 24d nor the fine adjustment relaying cylinder 24b, i.e., it has on its left side only the coarse adjustment operation ring 22b, and in that it has on its right side neither the coarse adjustment operation ring 26b nor the fine adjustment relaying cylinder 27b, i.e., it has on its right side only the fine adjustment operation ring 27d which is mounted on the microscope body 4 through another fine adjustment relaying cylinder 27e. In FIG. 4, parts which are the same as or correspond to those of FIG. 1 are indicated by the same reference numerals, detailed description thereof being omitted.

As shown in FIG. 4, the longitudinal length of the fine adjustment relaying cylinder 27e located on the right is shorter than that of the fine adjustment relaying cylinder 27b. A graduated scale ring 30 for use in detection of the rotational position of the fine adjusting handle is fixed to the right wall surface 4e of the microscope body 4 by means of a fixing screw 30a. One of the openings of the coarse adjustment operation ring 22b located on the left is closed by a lid 31. In the device shown in FIG. 4, selection of any combination of fine and coarse and right and left operation rings is made possible in addition to the removal of the operation ring.

I claim:

1. A coaxial fine and coarse adjusting device for moving a movable member movably supported on a device body, comprising:

first and second shaft end chambers which are open at two side wall surfaces of said device body;

a pair of coarse adjustment handles respectively provided near said first and second shaft end chambers;

a pair of fine adjustment handles respectively provided coaxially relative to said coarse adjustment handles;

a bearing member provided between said first and second shaft end chambers;

a rotation transmission shaft rotatably supported in said bearing member, said rotation transmission shaft having a pinion for causing movement of said movable member;

a hollow cylindrical coarse adjustment shaft which passes through said rotation transmission shaft and is rotatably supported by said rotation transmission shaft and said bearing member, one end of said coarse adjustment shaft being located in said first shaft end chamber and the other end thereof being located in said second shaft end chamber;

a rotatable fine adjustment shaft which passes through said coarse adjustment shaft;

a reduction gear train provided between said rotation transmission shaft and said fine adjustment shaft in said first shaft end chamber;

a first retaining member provided on said one end of said coarse adjustment shaft for retaining said reduction gear train in such a manner that said reduction gear train can rotate about its own axis and rotate about said coarse adjustment shaft, and for removably retaining one of said coarse adjustment handles;

a flange member provided on said other end of said coarse adjustment shaft for removably retaining the other of said coarse adjustment handles;

a pair of second retaining members provided on two ends of said fine adjustment shaft for removably retaining said fine adjustment handles;

first frictional braking means for frictionally braking said first retaining member so as to inhibit rotation of said first retaining member relative to said device body while a said fine adjustment handle is being rotated, and so as to allow rotation of said first retaining member relative to said device body while a said coarse adjustment handle is being rotated; and second frictional braking means for frictionally braking rotation of said pair of second retaining members relative to said coarse adjustment shaft, so as to inhibit relative rotation between said coarse adjustment shaft and said pair of second retaining members while said coarse adjustment shaft is being rotated, and so as to allow such relative rotation while a said fine adjustment handle is being rotated.

2. A coaxial fine and coarse adjusting device according to claim 1, wherein said bearing member has on one end thereof which is located in said first shaft end chamber a brim portion, said first frictional braking means being provided between a side surface of said brim portion and said first retaining member.

3. A coaxial fine and coarse adjusting device according to claim 1, wherein said second frictional braking means is provided between said flange member and one of said pair of second retaining members and has a frictional force smaller than or equal to that of said first frictional braking means.

4. A coaxial fine and coarse adjusting device according to claim 1, wherein each of said coarse adjustment handles includes a cylindrical member, and wherein each of said fine adjustment handles includes a relaying cylinder which passes through a corresponding said cylindrical member and is removably supported on a corresponding said second retaining member, and a fine adjustment operating member having a circular cross-section and covering one end portion of the corresponding said relaying cylinder and an opening of the corresponding said coarse adjustment handle.

5. A coaxial fine and coarse adjusting device for moving a movable member movably supported on a device body, comprising:

first and second shaft end chambers which are respectively open at two side wall surfaces of said device body;

a coarse adjustment handle provided near said first shaft end chamber;

a fine adjustment handle provided coaxially relative to said coarse adjustment handle;

a lid member for covering an opening of said second shaft end chamber;

a bearing member provided between said first and second shaft end chambers;

a rotation transmission shaft rotatably supported in said bearing member, said rotation transmission shaft having a pinion for causing movement of said movable member;

a hollow cylindrical coarse adjustment shaft which passes through said rotation transmission shaft and is rotatably supported by said rotation transmission shaft and said bearing member, one end of said coarse adjustment shaft being located in said first shaft end chamber and the other end thereof being located in said second shaft end chamber;

a rotatably fine adjustment shaft which passes through said coarse adjustment shaft;

a reduction gear train provided between said rotation transmission shaft and said fine adjustment shaft in said first shaft end chamber;

a first retaining member provided on said one end of said coarse adjustment shaft for retaining said reduction gear train in such a manner that said reduction gear train can rotate about its own axis and rotate about said coarse adjustment shaft, and for supporting said coarse adjustment handle;

a flange member provided on said other end of said coarse adjustment shaft in such a manner that it can mount said coarse adjustment handle;

a pair of second retaining members provided on two ends of said fine adjustment shaft in such a manner that each can mount said fine adjustment handle;

first frictional braking means for frictionally braking said first retaining member so as to inhibit rotation of said first retaining member relative to said device body while said fine adjustment handle is being rotated, and so as to allow rotation of said first retaining member relative to said device body while said coarse adjustment handle is being rotated, and a second frictional braking means for frictionally braking rotation of said pair of second retaining members relative to said coarse adjustment shaft so as to inhibit relative rotation between said coarse adjustment shaft and said pair of second retaining members while said coarse adjustment shaft is being rotated, and so as to allow such relative rotation while said fine adjustment handle is being rotated.

6. A coaxial fine and coarse adjusting device according to claim 5, wherein said bearing member has on one end thereof which is located in said first shaft end chamber a brim portion, said first frictional braking means being provided between a side surface of said brim portion and said first retaining member.

7. A coaxial fine and coarse adjusting device according to claim 5, wherein said second frictional braking means is provided between said flange member and one of said pair of second retaining members and has a frictional force smaller than or equal to that of said first frictional braking means.

8. A coaxial fine and coarse adjusting device according to claim 5, wherein said coarse adjustment handle includes a cylindrical member, and wherein said fine adjustment handle includes a relaying cylinder which passes through said cylindrical member and is removably supported on a corresponding said second retaining member, and a fine adjustment operating member having a circular cross-section and covering one end portion of said relaying cylinder and an opening of said coarse adjustment handle.

9. A coaxial fine and coarse adjusting device for moving a movable member movably supported on a device body, comprising:

first and second shaft end chambers which are respectively open at two side wall surfaces of said device body;

a coarse adjustment handle provided near said first shaft end chamber;

a fine adjustment handle provided near said second shaft end chamber;

a bearing member provided between said first and second shaft end chambers;

a rotation transmission shaft rotatably supported in said bearing member, said rotation transmission shaft having a pinion for causing movement of said movable member, a hollow cylindrical coarse adjustment shaft which passes through said rotation transmission shaft and is rotatably supported by said rotation transmission shaft and said bearing member;

a rotatable fine adjustment shaft which passes through said coarse adjustment shaft, one end of said fine adjustment shaft being located in said first shaft end chamber and the other end thereof being located in said second shaft end chamber;

a reduction gear train provided between said rotation transmission shaft and said fine adjustment shaft in said first shaft end chamber;

a first retaining member provided on one end of said coarse adjustment shaft for retaining said reduction gear train in such a manner that said reduction gear train can rotate about its own axis and rotate about said coarse adjustment shaft, and for supporting said coarse adjustment handle;

a flange member provided on the other end of said coarse adjustment shaft in such a manner that it can mount said coarse adjustment handle;

a pair of second retaining members provided on said two ends of said fine adjustment shaft in such a manner that each can mount said fine adjustment handle;

first frictional braking means for frictionally braking said first retaining member so as to inhibit rotation of said first retaining member relative to said device body while said fine adjustment handle is being rotated, and so as to allow rotation of said first retaining member relative to said device body while said coarse adjustment handle is being rotated; and second friction braking means for frictionally braking rotation of said pair of second retaining members relative to said coarse adjustment shaft so as to inhibit relative rotation between said coarse adjustment shaft and said pair of second retaining members while said coarse adjustment shaft is being rotated, and so as to allow such relative rotation while said fine adjustment handle is being rotated.

10. A coaxial fine and coarse adjusting device according to claim 9, wherein said bearing member has on one end thereof which is located in said first shaft end chamber a brim portion, said first frictional braking means being provided between surfaces a of said brim portion and said first retaining member.

11. A coaxial fine and coarse adjusting device according to claim 9, wherein said second frictional braking means is provided between said flange member and one of said pair of second retaining members and has a frictional force smaller than or equal to that of said first frictional braking means.

12. A coaxial fine and coarse adjusting device according to claim 9, wherein said coarse adjustment handle includes a cylindrical member, and wherein said fine adjustment handle is removably supported on one of said pair of second retaining members within said second shaft end chamber, and has a circular cross-section such that it covers an opening of said second shaft end chamber.

13. A coaxial fine and coarse adjusting device, comprising:

a housing having a first side wall and an oppositely disposed second side wall, and a first recessed chamber and a second recessed chamber open to said first side wall and said second side wall, respectively;

a moving member supported movably on said housing;

a rotation transmission shaft for causing movement of said moving member and rotatably supported about a rotation axis connecting said first and second chambers of said housing;

a hollow coarse adjustment shaft rotatably supported about said rotation axis and having opposite ends respectively disposed inside said first and second chambers;

a rotatable fine adjustment shaft passing through said coarse adjustment shaft;

transmission means for transmitting rotation of said coarse adjustment shaft to said rotation transmission shaft, and for transmitting rotation of said fine adjustment shaft at a reduced rotational speed to said rotation transmission shaft;

first and second retaining members each received in said first chamber, said first retaining member being provided on one end of said coarse adjustment shaft and said second retaining member being provided on one end of said fine adjustment shaft;

third and fourth retaining members each received in said second chamber, said third retaining member being provided on the other end of said coarse adjustment shaft and said fourth retaining member being provided on the other end of said fine adjustment shaft;

a first coarse adjustment handle for effecting a rotating operation of said coarse adjustment shaft, said first coarse adjustment handle projecting outside of said first chamber and being mounted removably to said first retaining member;

a first fine adjustment handle for performing a rotating operation of said fine adjustment shaft, said first fine adjustment handle projecting outside of said first chamber and being mounted removably to said second retaining member;

a second coarse adjustment handle for effecting a rotating operation of said coarse adjustment shaft, said second coarse adjustment handle projecting outside of said second chamber and being mounted removably to said third retaining member; and a second fine adjustment handle for performing a rotating operation of said fine adjustment shaft, said second fine adjustment handle projecting outside of said second chamber and being mounted removably to said fourth retaining member.

14. A coaxial fine and coarse adjusting device according to claim 13, wherein said transmission means includes a reduction gear train provided between said fine adjustment shaft and said rotation transmission shaft in said first chamber.

15. A coaxial fine and coarse adjusting device according to claim 13, wherein said transmission means further includes first frictional braking means provided between said housing and said first retaining member, and second frictional braking means provided between said third retaining member and said fourth retaining member.

* * * * *